Figure 1:
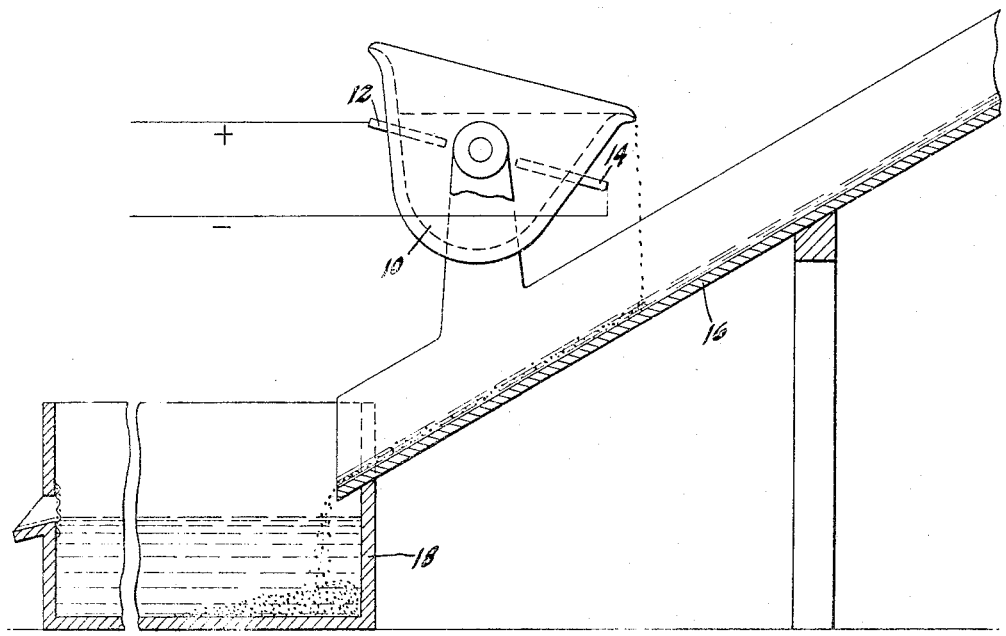

April 24, 1934.   T. G. McDOUGAL   1,955,821
CERAMIC PROCESS
Original Filed June 14, 1929

Inventor
Taine G. McDougal

By Blackmore, Spencer & Hulse
Attorneys

Patented Apr. 24, 1934

1,955,821

UNITED STATES PATENT OFFICE 1,955,821

CERAMIC PROCESS

Taine G. McDougal, Flint, Mich., assignor to A C Spark Plug Company, Flint, Mich., a company of Michigan Original application June 14, 1929, Serial No. 371,068. Divided and this application September 18, 1931, Serial No. 563,496. In Great Britain July 7, 1928

11 Claims. (Cl. 49—77)

This invention has to do with a new form of ceramic material for use in the manufacture of ceramic wares and with the method of producing that material.

Crystalline aluminum silicates used in the ceramic industry have heretofore been universally employed in the form of fully grown crystals, or fragments of fully grown crystals. It is in this form that they occur in nature. In the commercial or synthetic manufacture of such silicates for use in ceramic wares the raw material is fused and cooled at a slow rate, usually in the form of ingots of appreciable dimensions, and consequently the crystals are likewise fully grown. When such crystalline material is used in the production of preformed ceramic articles, it is essential that some binder be used to cause the crystalline particles to adhere to each other for the crystals themselves are refractory and incapable of cohering without complete fusion or solution by suitable fluxes at high temperatures.

Thus, in the manufacture of porcelains of high thermo-dielectric strength and high resistance to heat shock, such as are used for spark plug insulators and refractories, it is customary to employ as the non-plastic ingredient aluminum silicates in the form of finely pulverized particles of fully grown crystals. Mullite ($3Al_2O_3 2SiO_2$), andalusite ($Al_2O_3 SiO_2$), sillimanite and other very refractory aluminum silicates high in alumina are the ones now generally used for this purpose. To bind the particles together they are mixed with plastic material, such as clay, with the addition of suitable fluxes either carried as impurities by the plastic or non-plastic ingredients, or separately supplied. From the resulting plastic workable mass the ceramic wares are shaped, and these wares are then fired in the usual manner. The firing is carried to a temperature sufficient to vitrify the whole mass producing a bonded shape, but not to a high enough temperature to cause the bulk of the pulverized refractory crystals to be softened or dissolved by the fluxes for the reason that to do so would result in melting down the wares and causing them to lose their shape. Owing to the insufficient temperature the pulverized and stable crystalline material consequently is substantially unaffected by the final firing. The crystals are held together primarily by the wetting of their surfaces and by slight surface solution with the less refractory (fluxing) silicates present in the body. It has been recognized as desirable to improve the bond between the crystals and thereby also improve the quality of the fired body by welding the crystals into a crystalline framework, but, so far as I am aware, the only method by which this result has been accomplished heretofore has been by subjecting the ceramic composition to such high temperatures that practically complete fusion of all constitutents of the body took place with the result that molds had to be used to hold the ceramic material and give it shape. It occured to me that if the crystalline aluminum silicates could be produced in amorphous or crypto-crystalline condition, or in some other state of unstable crystallization, it might be possible to produce the desired crystalline framework within the shaped porcelain body by crystalline growth during final firing at the usual relatively low temperatures.

The crystalline aluminum silicates, such as mullite, are extremely refractory but it occurred to me that if they were subjected to practically complete fusion and quickly cooled, and preferably subjected to mechanical disintegration simultaneously with the cooling it would be possible to obtain them in the desired state of unstable crystallization. In carrying on this development in one experiment, a small rod of a complex silicate consisting largely of mullite was held in the flame of an oxy-acetylene blow torch, and the melted drops were caught in a tank of water. It was thought that the sudden cooling of the refractory would prevent complete crystallization. However, upon examination the cooled material, it was found to consist of substantially fully grown crystals. This seemed to point to the impossibility of accomplishing the result by the use of ordinary cooling methods, but it occurred to me that the difficulty may have been that the blast force of the oxy-acetylene flame caused the particles of material to be broken off the parent rod before they had opportunity to come to full liquid fusion. It also seemed probable that the cooling medium was not continuously in sufficiently intimate contact with the material to be cooled nor was a sufficiently large volume of the cooling medium made use of to avoid crystallization. There was also lacking any effective mechanical comminution of the molten material.

It occurred to me that if the refractory material were heated to absolute fusion and then poured drop by drop, or in a very fine stream, into a trough down which a strong stream of water was flowing, it would be possible to secure the desired result. In employing this method the molten material would be broken up by striking the trough and by the force of the stream of water, into droplets, bubbles, sheets or ribbons that would present a maximum surface for contact with the cooling medium. By employing a rapidly flowing stream of large volume, the utmost comminution of the droplets as well as maximum and uniform rate of cooling would be assured.

In carrying out this conception it may, in some cases, be most convenient to direct a large stream of water under considerable pressure upon the thin stream of melted refractory so as to positively break up the refractory into small particles, and effect thorough mixing with the cooling water. This may be done by employing a nozzle, such as used on fire hose, to direct the water on the thin stream of the molten material. The particles or globules of the material are carried on by the stream into a tank where they settle out as before. This fusing and rapid cooling treatment, the latter made possible by the smallness of the globules, rapidity of introduction into the cooling medium, and the rapid flow of the water, results in a product practically all of which is in an unstable crystalline state. This unstable crystalline material consists of cryptocrystals, that is, crystals that require the highest magnification to render them visible; of very minute crystals, the largest of which are of magnitude of the order of .10 millimeters; and also of unstable glass which latter crystallizes in the final firing of the product. In practically all aluminum silicate compositions produced by this process the majority of the crystals are very much under .10 millimeters, and in some compositions practically no crystals are produced of larger magnitude than .001 millimeters.

Porcelain batches were made up with the described material as the non-plastic ingredient, and articles were molded from the batch and fired in the usual manner. Examination of the fired bodies showed that there had been continued as well as additional crystalline growth made possible because of the presence of the unstable glass referred to above. The bodies, upon testing, proved to have increased mechanical and dielectric strength as well as greater resistance to heat shock. I believe the better physical properties may be attributed to the growth of crystalline particles by accretion from the unstable glass surrounding them, and by the joining together of adjacent crystalline particles to form the fully developed stable crystals.

In the drawing I have illustrated diagrammatically several different forms of apparatus by which my method may be carried out.

In Figure 1, the material which it is desired to produce in unstable crystalline state is heated in a pot or crucible 10 by means of an arc passing between electrodes 12 and 14 immersed in the pot. Any desired number of electrodes may be used. When the refractory material has reached the state of complete fusion, it is poured in a fine stream, or drop by drop, into a stream of water flowing down a trough 16 and discharging into tank 18. The melted material upon striking the trough is broken up into small droplets, and is very rapidly and evenly cooled because of the large surface area exposed and the intimate contact with the large volume of water.

Figure 2:
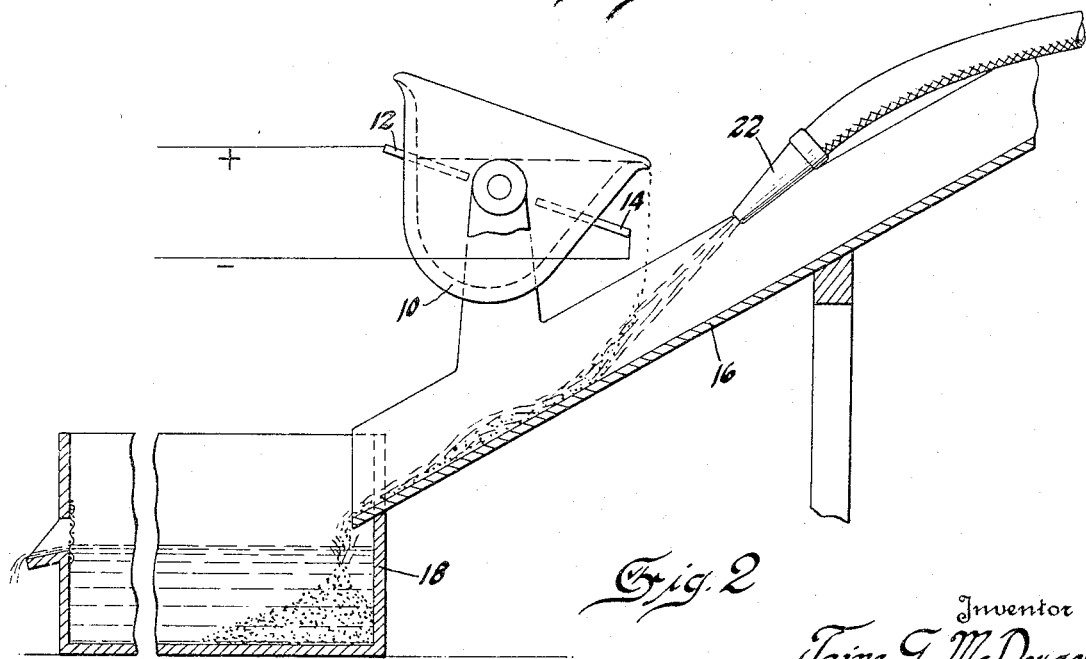

Figure 2 shows a modified form of apparatus. Here the stream of molten material is broken up by a water jet under high pressure. The jet may be projected from a fire hose such as shown at 22. The violence of the impact of the jet of water on the molten material will break it up into fine particles or droplets and the large volume of water employed will assure rapid and even cooling. The jet discharges into a tank 18 where the material will settle out.

The above apparatus is diagrammatically illustrated and is capable of great variation in practice. Other heating arrangements may be employed and the cooling means may be considerably varied so long as the essential step of very rapid cooling of the molten material is retained.

The above process is applicable to various kinds of refractory materials, but it is particularly valuable in the case of aluminum silicates such as sillimanite, mullite and andalusite, and others of the class of aluminum silicates having a higher alumina to silica molecular ratio than kaolin. In applying the process to these aluminum silicates, I have preferably used with them a certain proportion of suitable fluxes. Where a single flux is employed I prefer to use it in the approximate percentage indicated in the table below:

| | Per cent |
|---|---|
| MgO | 6 |
| $Li_2O$ | 8 |
| $K_2O$ | 10 |
| $Na_2O$ | 10 |
| CaO | 6 |
| BaO | 10 |

If desired, combinations of two or more fluxes may be employed. The addition of one of these aluminum silicates, in unstable crystalline form to a ceramic batch for use in making spark plug porcelains results in the production of a fired product possessing in much greater degree the advantages of mechanical strength and resistance to heat stock. As an example of one specific batch, I have had very good results with plugs made of a raw batch consisting of 50% plastic clay and the remainder non-plastic ingredients comprising 45% aluminum silicates, in unstable crystalline form and 5% magnesium oxide or other suitable flux. The specific non-plastic ingredient used was produced by the described method from Durox, a commercial electric furnace product marketed by the Vitrefrax Company of Los Angeles, California. In my copending application, S. N. 291,127, filed July 7, 1928, I have claimed this method of making porcelain-like articles, both broadly and specifically, and have also claimed the resultant superior product.

Not only is my invention of value in the manufacture of the class of porcelains such as are used for spark plug insulators, but also in the manufacture of all kinds of ceramic wares, both vitreous and non-vitreous. Thus ceramic batches including as ingredients aluminum silicates particularly those higher in alumina than clay, prepared according to my process, are well adapted for the manufacture of refractory linings for furnaces and various other heat resisting bodies. They are also obviously especially desirable in the manufacture of high grade electrical insulators. It is possible to produce preformed wares from my improved material alone with the addition of suitable fluxes, although in most cases, it will be found desirable to use a plastic bond.

I believe the great advantage of the unstable forms of the glass and crystalline phases lies in the fact that upon firing further crystalline growth takes place. Where such highly refractory substances have been employed in the past in crystalline form, they were not completely fused, and consequently did not amalgamate with the whole mass but appeared in the burned product in practically the same state in which they were introduced into the raw body. This may be explained as follows:

Inasmuch as such ingredients are introduced in the raw ceramic batch as finely ground and shattered fragments of their original crystalline forms, they do not have an opportunity (because they or their derivatives are in a stable refractory and practically inert state) to grow by orientation into their natural full crystalline forms. For instance a raw ceramic batch into which fragments of refractory andalusite crystals had been introduced would not develop in the firing process the formation of any of the desirable needle-like mullite (formerly erroneously identified as sillimanite) crystals because the latter retain the shape and position of the andalusite fragments as introduced.

By my invention the aluminum silicates are produced in an unstable form and are surrounded by material of nearly the same chemical composition in amorphous and unstable state so that under subsequent heat treatment, as in the firing of the ceramic mass to form the final product, the arrested crystals grow by accretion from the surrounding material and the unstable glass devitrifies to form additional crystalline shapes.

By my process the necessary ingredients to form normally grown crystals, such as the desirable needle-like mullite form, are introduced in an unstable form preferably with fluxes intimately included or in solution, and from the resultant product crystals easily form with application of the heat in the subsequent firing process. This resumed and additional crystallization during final firing produces the desired crystalline distribution throughout the body giving the desired improvement in its thermo-electric properties, mechanical strength, and resistance to heat shock.

The essential feature of my process is to cool the molten masses at a sufficiently rapid rate to prevent or effectively prohibit or retard crystalline growth such as would normally occur with such compositions should they be allowed to cool at normal or retarded rates such as prevail with the usual ingot process.

While I have indicated several methods by which my process may be carried out as well as a number of uses of the new product, it is to be understood that these are merely given as examples and do not indicate the precise limits of the method or of the uses of the product.

This application is a division of my prior application, Serial No. 371,068, filed June 14, 1929, said application being a continuation of my prior application, Serial No. 291,126 filed July 7, 1928.

I claim:

1. The method of producing aluminum silicates in the form of cryptocrystals, minute crystals not exceeding .010 mm. in size, and unstable glass for use in the manufacture of ceramic shapes which consists in heating the material to fusion, dividing the material into small particles, and subjecting the particles to rapid cooling action.

2. The method of producing aluminum silicates in the form of cryptocrystals, minute crystals not exceeding .010 mm. in size, and unstable glass for use in the manufacture of ceramic shapes which consists in heating the material to fusion, and subjecting it to contact with a flowing stream of cooling liquid and simultaneously to mechanical disintegration.

3. The method of producing aluminum silicates in the form of cryptocrystals, minute crystals not exceeding .010 mm. in size, and unstable glass for use in the manufacture of ceramic shapes which consists in heating the material to fusion in the presence of one or more fluxes, dividing the material into small particles, and subjecting the particles to rapid cooling action.

4. The method of producing aluminum silicates in the form of cryptocrystals, minute crystals not exceeding .010 mm. in size, and unstable glass for use in the manufacture of ceramic shapes which consists in heating the material to fusion in the presence of one or more fluxes, and subjecting it to contact with a flowing stream of cooling liquid and simultaneously to mechanical disintegration.

5. The method of producing aluminum silicates in the form of cryptocrystals, minute crystals not exceeding .010 mm. in size, and unstable glass for use in the manufacture of ceramic shapes which consists in heating the material to fusion in the presence of one or more fluxes, and spattering it by contact with an obstructing surface and subjecting it to cooling contact with a stream of liquid.

6. The method of producing aluminum silicates in the form of cryptocrystals, minute crystals not exceeding .010 mm. in size, and unstable glass for use in the manufacture of ceramic shapes which consists in heating the material to fusion in the presence of one or more fluxes, and pouring the melted material in a thin stream upon a surface over which a stream of cooling liquid is flowing, and collecting it in a suitable settling chamber.

7. The method of producing aluminum silicates in the form of cryptocrystals, minute crystals not exceeding .010 mm. in size, and unstable glass for use in the manufacture of ceramic shapes which consists in heating the material to fusion in the presence of one or more fluxes, and subjecting the material to rapid cooling action.

8. The process of preparing aluminum silicates for use in porcelains and the like, which consists in fusing an aluminum silicate with a flux, the flux being in sufficient quantity to produce a proportion of unstable glass, and subjecting the material to rapid cooling action, producing an aluminum silicate in the form of cryptocrystals, minute crystals not exceeding .010 mm. in size, and unstable glass.

9. The process of preparing aluminum silicates for use in refractory ceramic bodies which consists in fusing an aluminum silicate having a higher ratio of alumina and silica than kaolin with a flux, and subjecting the material in comminuted form to rapid cooling action thereby producing aluminum silicate in the form of cryptocrystals, minute crystals not exceeding .010 mm. in size and unstable glass.

10. The process of preparing mullite for use in refractory ceramic bodies which consists in fusing mullite with a flux, and subjecting the fused material in comminuted form to rapid cooling action thereby producing mullite in the form of cryptocrystals, minute crystals not exceeding .010 mm. in size and unstable glass.

11. The method of producing aluminum silicates of substantial amorphous content for use in the manufacture of ceramic shapes which consists in heating the material to fusion, dividing the material into small particles, and subjecting the particles to rapid cooling action.

TAINE G. McDOUGAL.